United States Patent
Dariush

(10) Patent No.: US 9,205,887 B2
(45) Date of Patent: Dec. 8, 2015

(54) CONSTRAINED RESOLVED ACCELERATION CONTROL

(75) Inventor: Behzad Dariush, Menlo Park, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 231 days.

(21) Appl. No.: 13/580,650

(22) PCT Filed: Feb. 17, 2011

(86) PCT No.: PCT/US2011/025308
§ 371 (c)(1),
(2), (4) Date: Sep. 18, 2012

(87) PCT Pub. No.: WO2011/106239
PCT Pub. Date: Sep. 1, 2011

(65) Prior Publication Data
US 2013/0013112 A1   Jan. 10, 2013

Related U.S. Application Data

(60) Provisional application No. 61/308,203, filed on Feb. 25, 2010.

(51) Int. Cl.
*B62D 57/032* (2006.01)
*B25J 9/16* (2006.01)

(52) U.S. Cl.
CPC ............. *B62D 57/032* (2013.01); *B25J 9/1697* (2013.01)

(58) Field of Classification Search
CPC ...... B25J 9/1697; B25J 19/023; B25J 9/1692; G05D 1/0246; G05B 2219/37572
USPC ................... 700/245, 248, 250, 252
See application file for complete search history.

(56) References Cited

U.S. PATENT DOCUMENTS

| | | | |
|---|---|---|---|
| 5,737,500 A | | 4/1998 | Seraji |
| 6,004,016 A | * | 12/1999 | Spector ................. B25J 9/1666 700/247 |
| 6,591,146 B1 | * | 7/2003 | Pavlovic ............ G06K 9/00335 342/102 |
| 6,683,968 B1 | * | 1/2004 | Pavlovic .............. G06K 9/6297 342/95 |
| 6,694,044 B1 | * | 2/2004 | Pavlovic ............ G06K 9/00335 342/95 |
| 6,944,317 B2 | * | 9/2005 | Pavlovic ............ G06K 9/00335 348/154 |

(Continued)

FOREIGN PATENT DOCUMENTS

| JP | 2008-238395 A | 10/2008 |
|---|---|---|
| JP | 2009-521334 A | 6/2009 |
| JP | 2009-521751 A | 6/2009 |

OTHER PUBLICATIONS

PCT International Search Report and Written Opinion, PCT Application No. PCT/US2011/025308, Jun. 2011, eleven pages.

(Continued)

*Primary Examiner* — Ian Jen
(74) *Attorney, Agent, or Firm* — Arent Fox LLP

(57) ABSTRACT

A system, method, and computer program product for controlling an articulated system are described. The system estimates kinematics of body segments of the articulated system and constructs a weighted pseudo-inverse matrix to enforce kinematic constraints as well as achieve dynamic consistency based on the estimated kinematics. The system converts task descriptors to joint commands using the weighted pseudo-inverse matrix and controls the articulated system at both the velocity level and the acceleration level and enforces kinematic constraints using the joint commands.

20 Claims, 5 Drawing Sheets

100

(56) References Cited

U.S. PATENT DOCUMENTS

| | | | |
|---|---|---|---|
| 7,623,944 B2* | 11/2009 | Dariush | A61B 5/4528 318/560 |
| 7,859,540 B2 | 12/2010 | Dariush | |
| 8,170,287 B2* | 5/2012 | Dariush | G11C 11/5621 382/106 |
| 2002/0198472 A1 | 12/2002 | Kramer et al. | |
| 2004/0071317 A1* | 4/2004 | Pavlovic | G06K 9/6297 382/103 |
| 2005/0104548 A1* | 5/2005 | Takenaka | B62D 57/032 318/568.12 |
| 2005/0209534 A1* | 9/2005 | Dariush | A61B 5/1038 600/595 |
| 2006/0074558 A1* | 4/2006 | Williamson | G01C 21/165 701/469 |
| 2006/0139355 A1* | 6/2006 | Tak | G06T 13/40 345/473 |
| 2006/0250402 A1* | 11/2006 | Perlin | G06T 13/40 345/474 |
| 2007/0016329 A1* | 1/2007 | Herr | B62D 57/032 700/250 |
| 2007/0104351 A1* | 5/2007 | Yang | G06K 9/00342 382/103 |
| 2007/0146371 A1* | 6/2007 | Dariush | B25J 9/1602 345/474 |
| 2007/0162164 A1* | 7/2007 | Dariush | B25J 9/1602 700/61 |
| 2007/0255454 A1* | 11/2007 | Dariush | G06N 3/008 700/245 |
| 2009/0074252 A1* | 3/2009 | Dariush | G11C 16/349 382/107 |
| 2009/0105878 A1* | 4/2009 | Nagasaka | B25J 13/084 700/245 |
| 2009/0118863 A1* | 5/2009 | Dariush | B25J 9/1666 700/255 |
| 2009/0251594 A1* | 10/2009 | Hua | G06T 11/00 348/441 |
| 2009/0252423 A1* | 10/2009 | Zhu | G06K 9/00201 382/209 |
| 2009/0278791 A1 | 11/2009 | Slycke et al. | |
| 2010/0215271 A1* | 8/2010 | Dariush | G06K 9/48 382/180 |
| 2012/0271540 A1* | 10/2012 | Miksa | G01C 21/30 701/409 |

OTHER PUBLICATIONS

Chan, T.F., et al., "A Weighted Least-Norm Solution Based Scheme for Avoiding Joint Limits for Redundant Joint Manipulators," IEEE Transactions on Robotics and Automation, vol. 11, No. 2, pp. 286-292, Apr. 1995.

Chiaverini, S., et al., "Review of the Damped Least-Squares Inverse Kinematics with Experiments on an Industrial Robot Manipulator," IEEE Transactions on Control Systems Technology, vol. 2, No. 2, pp. 123-134, Jun. 1994.

Carnegie Mellon University, "CMU Graphics Lab Motion Capture Database," 2 Pages, [online] [retrieved on Nov. 20, 2012] Retrieved from the internet <http://mocap.cs.cmu.edu/>.

Dariush, B., et al., "Constrained Closed Loop Inverse Kinematics," 2010 IEEE International Conference on Robotics and Automation, Anchorage Convention District, May 3-8, 2010, Anchorage, Alaska, USA, pp. 2499-2506.

Dariush, B., et al., "Online Transfer of Human Motion to Humanoids," International Journal of Humanoid Robotics, vol. 6, No. 2, pp. 265-289, 2009.

Ehmann, S.A., Swift ++, "Speedy Walking via Improved Feature Testing for Non-Convex Objects," Version 1.0, Application Manual, UNC Chapell Hill, pp. 1-22, [online] [retrieved on Nov. 20, 2012] can be retrieved at <http://gamma.cs.unc.edu/SWIFT++/SWIFT++.pdf>.

Hsu, P., et al., "Dynamic Control of Redundant Manipulators," Journal of Robotic Systems, vol. 6, No. 2, pp. 133-148, 1989.

Khatib, O., "Real-Time Obstacle Avoidance for Manipulators and Mobile Robots," The International Journal of Robotics Research, vol. 5, No. 1, pp. 90-98, 1986.

Khatib, O., "A Unified Approach for Motion and Force Control of Robot Manipulators: The Operational Space Formulation," IEEE Journal of Robotics and Automation, vol. 3, No. 1, pp. 43-53, Feb. 1987.

Luh, J.Y.S., et al., "Resolved-Acceleration Control of Mechanical Manipulators," IEEE Transactions on Automatic Control, vol. 25, No. 3, pp. 468-474, Jun. 1980.

Maciejewski, A.A., et al., "Obstacle Avoidance for Kinematically Redundant Manipulators in Dynamically Varying Environments," The International Journal of Robotics Research, vol. 4, No. 3, pp. 109-117, 1985.

Nakazawa, A., et al., "Imitating Human Dance Motions through Motion Structure Analysis," Proceedings of the 2002 IEEE/RSJ International Conference on Intelligent Robots and Systems, EPFL, Lausanne, Switzerland, Oct. 2002, pp. 2539-2544.

Oshita, M., et al., "A Dynamic Motion Control Technique for Human-like Articulated Figures," Eurographics, vol. 20, No. 3, pp. 192-203, Sep. 2001.

Oshita, M., et al., "Motion tracking with Dynamic Simulation," Proceedings of the Eurographics Workshop on Animation and Simulation 2000, Interlaken Switzerland, Springer Wien, Aug. 21-22, 2000, pp. 59-71.

Pronost, N., et al., "Validating retargeted and interpolated locomotions by dynamics based analysis," Proceedings of the Fourth International Conference on Computer Graphics and Interactive Techniques in Australasia and Southeast Asia, Nov. 29, 2006, pp. 65-74.

Sentis, L., et al., "A Whole-Body Control Framework for Humanoids Operating in Human Environments," Proceedings of the 2006 IEEE International Conference on Robotics and Automation, Orlando, Florida, USA, May 15-19, 2006, pp. 2641-2648.

Stasse, O., et al., "Real-Time (Self)-Collision Avoidance Task on a HRP-2 Humanoid Robot," 2008 IEEE International Conference on Robotics and Automation, Pasadena, California, USA, May 19-23, 2008, pp. 3200-3205.

Sugiura, H., et al., "Real-Time Collision Avoidance with Whole Body Motion Control for Humanoid Robots," Proceedings of the 2007 IEEE/RSJ International Conference on Intelligent Robots and Systems, San Diego, California, USA, Oct. 29-Nov. 2, 2007, pp. 2053-2058.

Tak, S., et al., "Motion Balance Filtering," Eurographics, vol. 19, No. 3, pp. 437-446, Sep. 2000.

Tak, S., et al., "A Physically-Based Motion Retargeting Filter," ACM Transactions on Graphics, vol. 24, No. 1, pp. 98-117, Jan. 2005.

Zordan, V.B., et al., "Tracking and Modifying Upper-body Human Motion Data with Dynamic Simulation," Proceedings of Computer Animation and Simulation '99, Milano, Italy, Sep. 7-8, 1999, 11 Pages.

Office Action for Japanese Patent Application No. JP 2012-555050, Jun. 9, 2015, 8 Pages.

Japanese Office Action, Japanese Application No. 2012-555050, Nov. 11, 2014, 8 pages.

\* cited by examiner

CONSTRAINED RESOLVED ACCELERATION CONTROL

RELATED APPLICATIONS

This application claims the benefit of U.S. Provisional Application No. 61/308,203, filed Feb. 25, 2010, the content of which is incorporated by reference herein in its entirety.

This application is related to U.S. patent application Ser. No. 12/258,184, filed Oct. 24, 2008, titled "Real-Time Self Collision And Obstacle Avoidance Using Weighting Matrix", and U.S. patent application Ser. No. 12/257,664, filed Oct. 24, 2008, titled "Real-Time Self Collision And Obstacle Avoidance", both of which are incorporated by reference herein in their entirety.

BACKGROUND

1. Field of Disclosure

The disclosure generally relates to the field of controlling motion of a system, and more specifically, to controlling motion of a system to perform tasks while enforcing constraints of the system.

2. Description of the Related Art

When a robot is controlled to perform certain operational tasks in a task-space, that robot's number of degrees of freedom (also called "DoF") typically exceeds what is required to perform the operational tasks. In such circumstances, the robot is said to exhibit redundancy since there exist infinite joint motions that produce the specified task motion.

The occurrence of redundancy with respect to the specified tasks gives opportunity to achieve other objectives, such as avoiding obstacles, avoiding structural limits (e.g., joint limits, and self collisions), minimizing energy consumption, and creating balanced motions. See A. A. Maciejewski and C. A. Klein, "Obstacle avoidance for kinematically redundant manipulators in dynamically varying environments", *International Journal of Robotics Research*, 4:109-117 (1985); see also H. Sugiura, M. Gienger, H. Janssen, and C. Goerick, "Real-time collision avoidance with whole body motion control for humanoid robots", *IEEE/RJS Int. Conf on Intelligent Robots and Systems* (2007). In early research on redundancy resolution schemes, many of these objectives (including enforcing kinematic constraints) were considered as secondary tasks, performed in the null-space of the higher priority operational tasks. See Y. Nakamura, "Advanced Robotics, Redundancy and Optimization", Addison-Wesley (1991); see also P. Hsu, J. Hauser, and S. Sastry, "Dynamic control of redundant manipulators", *J. Robotic Systems*, 6(2):133-148 (1989).

Formulating constraints as secondary tasks cannot guarantee that constraints will be satisfied if there are insufficient degrees of freedom to satisfy both objectives (i.e., the operational tasks and the secondary tasks). In many cases, satisfying constraints is critical and therefore must be given priority over execution of operational tasks. A suggested solution is to formulate constraints as the highest priority operation and project the operational tasks onto the constraint null-space. See L. Sentis and O. Khatib, "A whole-body control framework for humanoids operating in human environments", *IEEE Int. Conf. Robotics and Automation*, Orlando, Fla. (2006). However, this solution has several drawbacks, particularly for the case when the task and constraint spaces are not known in advance.

As an example, consider a scenario of real-time transfer of task level motion from a human demonstrator to a humanoid robot. See B. Dariush, M. Gienger, A. Arumbakkam, Y. Zhu, B. Jian, K. Fujimura, and C. Goerick, "Online transfer of human motion to humanoids", *International Journal of Humanoid Robotics*, 6:265-289 (2009). This scenario involves execution of an unplanned task motion subject to kinematic and balance constraints. The transferred motion may result in simultaneous self collisions occurring between multiple segment pairs, or violations of multiple joint limits. Two problems may arise under such circumstances. First, the constraint null-space may not exist, making infeasible the execution of secondary objectives, including tracking of the operational tasks. Second, in case of self collision avoidance, the Cartesian positions corresponding to the minimum distances between two colliding body segments are generally discontinuous, resulting in numerical and algorithmic instabilities which require special care. Thus, approaches solely based on null-space projections are insufficient to execute secondary objectives if there is no redundancy.

SUMMARY

Embodiments of the present invention provide a method (and corresponding system and computer program product) for controlling an articulated system. According to one aspect, the method estimates kinematics of body segments of the articulated system and constructs a weighted pseudo-inverse matrix to enforce kinematic constraints as well as achieve dynamic consistency based on the estimated kinematics. The method converts task descriptors to joint commands using the weighted pseudo-inverse matrix and controls the articulated system at both the velocity level and the acceleration level and enforces kinematic constraints using the joint commands.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

The present invention provides a motion control system (and corresponding method and computer program product) for controlling robots and other robotic mechanisms. The system controls movements of the robotic mechanisms at the acceleration level and enforces kinematic constraints of the robotic mechanisms.

The Figures (FIGS.) and the following description relate to embodiments of the present invention by way of illustration only. Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Motion Retargeting Environment

Figure 1:
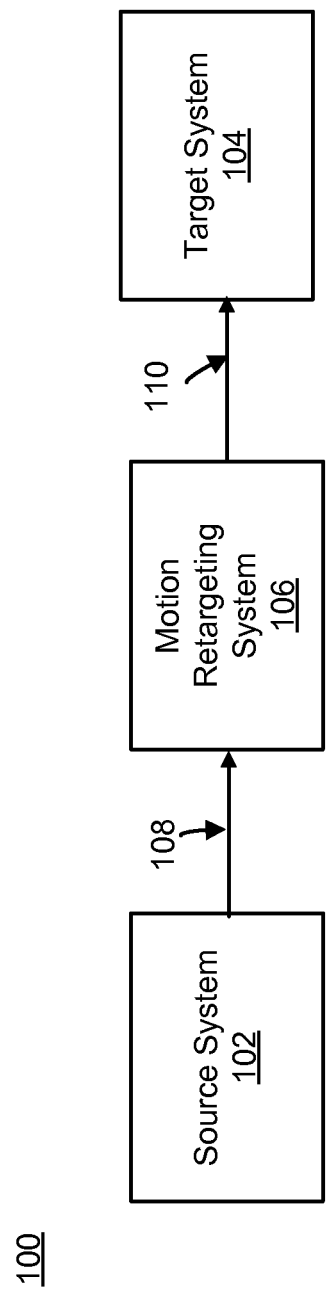
FIG. 1 is a block diagram illustrating a motion retargeting environment in accordance with one embodiment of the invention.

FIG. 1 is a block diagram illustrating a motion retargeting environment 100 for controlling a target system 104, such as a robotic/bio-robotic system, to simulate motions tracked in a source system 102 in real time while enforcing restrictions such as joint limits and collision constraints, according to one embodiment of the present invention. A motion retargeting system 106 captures a depth image stream 108 of the source system 102. The source system 102 may be any motion generator, for example, a human or an animal. In response to motions of the source system 102 captured in the depth image stream 108, the motion retargeting system 106 generates joint variables 110 for controlling the motion of the target system 104. The target system 104 may be, for example, a generic articulated system, such as a robot, an articulated mechanism (e.g., a humanoid robot), an avatar, or an exoskeleton apparatus for wearing by a human or animal.

In one embodiment, the motion retargeting system 106 captures motions generated in the source system 102 and transfers the captured motions to the target system 104, a process commonly referred to as motion retargeting. Motions in the source system 102 are captured in the depth image stream 108 by a camera and tracked (e.g., by measuring marker positions, feature points) and expressed as motion descriptors (also known as motion trajectories, desired task descriptors, task variables) using one or more motion primitives in Cartesian (or task) space by the motion retargeting system 106. The motion retargeting system 106 converts the motion descriptors to the joint variables 110 (also known as joint space trajectories, joint motions, joint commands, joint motion descriptors) at both the velocity level and the acceleration level using a weighted pseudo-inverse matrix. The motion retargeting system 106 uses the joint variables 110 to control the target system 104 to simulate the motion in the source system 102. The motion retargeting system 106 can impose constraints on motion in the target system 104 to avoid joint limits, muscular torque limits, self collisions, obstacles, and the like.

For the sake of illustration, without loss of generality, the source system 102 represents a human model and the source motion represents human motion primitives which are typically observed or inferred from measurements, and the target system 104 represents a humanoid robot that is controlled to imitate the human model's motion.

Example Architectural Overview of Motion Retargeting System

Figure 2:
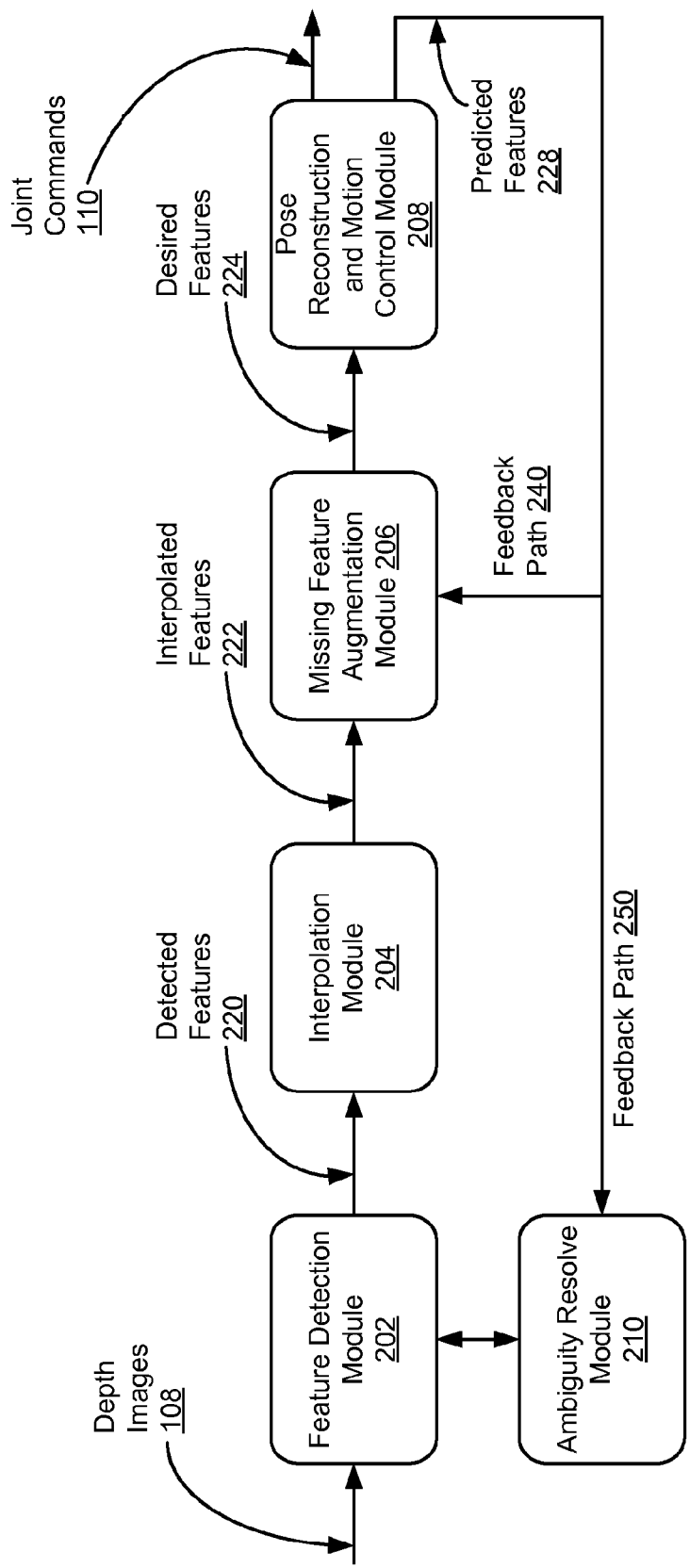
FIG. 2 is a block diagram illustrating an architecture of a motion retargeting system shown in FIG. 1 in accordance with one embodiment of the invention.
Figure 5:
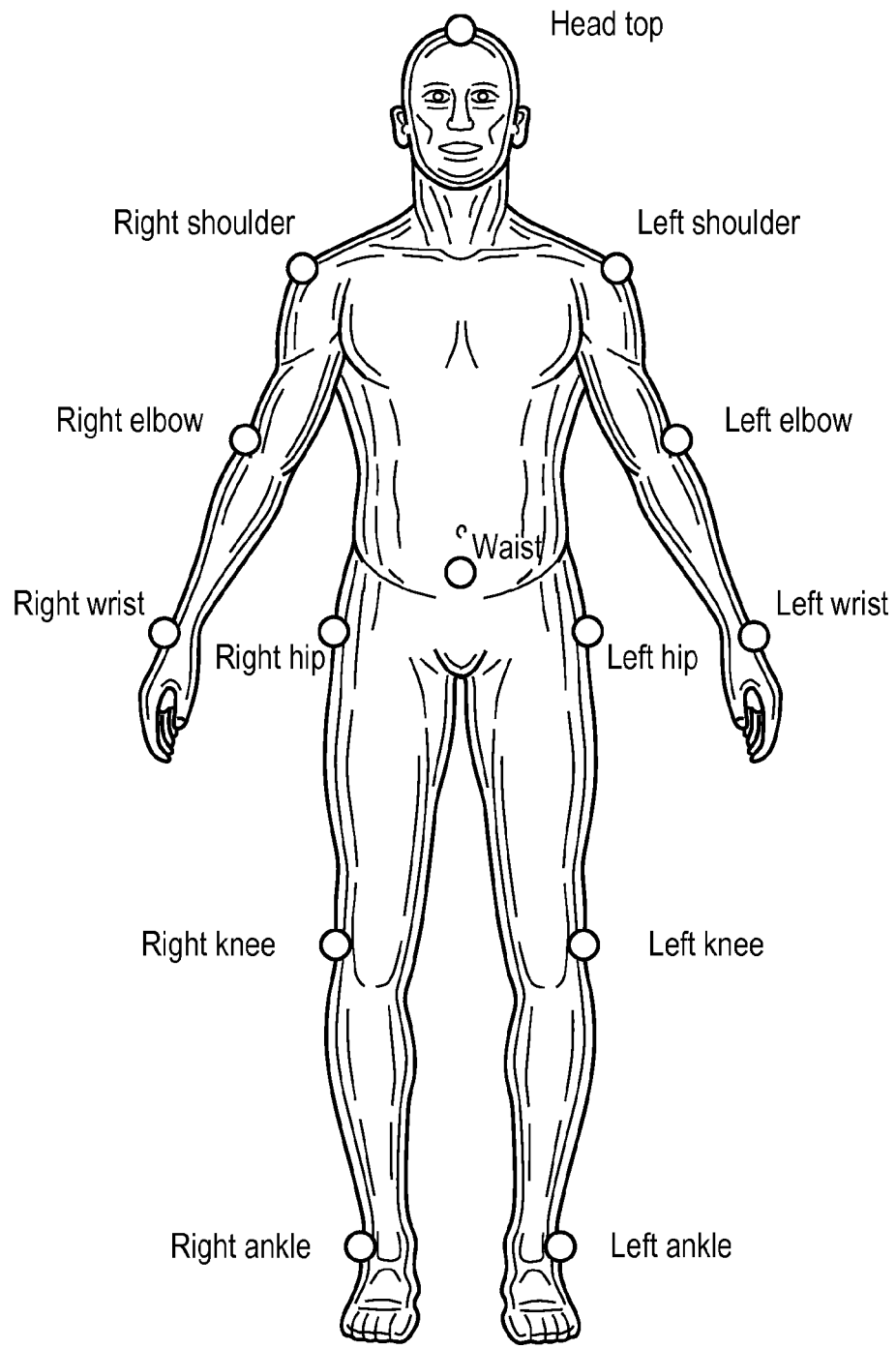
FIG. 5 is a diagram illustrating a human model in accordance with one embodiment of the invention.

FIG. 2 is a block diagram illustrating a configuration of the motion retargeting system 106 for generating joint commands 110 from the depth image stream 108 according to one embodiment. The motion retargeting system 106 reconstructs body poses of a human actor from multiple features detected in the depth image stream 108. The features (or feature points, anatomical features, key points) correspond to 3D positions of prominent anatomical landmarks on the human body. Without loss of generality, the motion retargeting system 106 tracks fourteen (k=14) such body features as illustrated in FIG. 5. As shown, the fourteen features are head top, left shoulder, right shoulder, left elbow, right elbow, left wrist, right wrist, left hip, right hip, waist, left knee, right knee, left ankle, and right ankle. The reconstructed (or estimated) human pose is described in the human model that tracks the human actor's pose. In one embodiment, the human model is a human anatomical model that closely resembles the body of the human actor.

As shown in FIG. 2, the motion retargeting system 106 comprises a feature detection module (also called a key-point detection module) 202, an interpolation module 204, a missing feature augmentation module 206, a pose reconstruction and motion control module 208, and an ambiguity resolve module 210.

The feature detection module 202 is configured to receive the depth image stream 108, detect features in the depth image stream 108, and output the detection results. Due to occlusions, unreliable observations, or low confidence in the detection results, the actual number of detected features for a particular image frame, denoted by m (m=0 . . . k), may be fewer than k.

The interpolation module 204 is configured to low pass filter the detected features received from the feature detection module 202 and generate interpolated features. In one embodiment, the depth images transmitted to the motion retargeting system 106 is captured at approximately 15 frames per second using a time of flight (TOF) camera (e.g., a Swiss Ranger SR-3000 3D time of flight camera). For stability in numerical integrations performed in the pose reconstruction and motion control module 208 in subsequent modules, the interpolation module 204 re-samples the detected features to a higher rate (e.g., 100 HZ).

The missing feature augmentation module 206 is configured to augment the interpolated features with positions of features missing in the depth image stream 108 and generate desired (or augmented) features. As noted above, the number of detected features at each frame may be fewer than fourteen (i.e. m<k=14) due to occlusions or unreliable observations. The missing feature augmentation module 206 receives predicted features from the pose reconstruction and motion control module 208 through a feedback path 240 and utilizes the predicted features to augment the missing features. The augmented features represents the k=14 desired features used as input to the pose reconstruction and motion control module 208.

The pose reconstruction and motion control module 208 is configured to generate estimated poses and predicted features based on the desired features, the accurate human model, and its constraints, and generate joint commands based on the reconstructed body pose for controlling the target system 104. The pose reconstruction and motion control module 208 is further configured to transmit the predicted features to the missing feature augmentation module 206 to augment intermittently missing or occluded features, and to the ambiguity resolve module 210 to resolve subsequent ambiguities in case multiple feature candidates are detected. The estimated (or reconstructed, recovered) pose describes the predicted motion and pose of all n degrees of freedom in the human model.

The ambiguity resolve module 210 is configured to resolve ambiguities when the feature detection module 202 detects multiple possible feature candidates. The ambiguity resolve module 210 receives the predicted features from the pose reconstruction and motion control module 208 through a feedback path 250 and utilizes the predicted features to resolve the ambiguities. For example, the predicted features may indicate that the hypothesized location of one candidate for a feature (i.e., from the feature detection module 202) is highly improbable, causing the ambiguity resolve module 210 to select another candidate of the feature as the detected feature. As another example, the ambiguity resolve module 210 may choose the feature candidate that is closest to the corresponding predicted feature to be the detected feature. Alternatively or additionally, the ambiguity resolve module 210 may use the predicted feature as the detected feature.

The motion retargeting system 106, or any of its components described above, may be configured as software (e.g., modules that comprise instructions executable by a processor), hardware (e.g., an application specific integrated circuit), or a combination thereof. The software and/or hardware may operate in a computer system that is structured to include a processor, memory, non-transitory computer-readable storage medium (e.g., hard drive), network interfaces, and applicable operating system and other functional software (e.g., network drivers, communication protocols). Those of skill in the art will recognize that other embodiments can have different and/or additional modules than those shown in FIG. 2. Likewise, the functionalities can be distributed among the modules in a manner different than described herein. Further, some of the functions can be provided by entities other than the motion retargeting system 106.

System Operation

Figure 3:
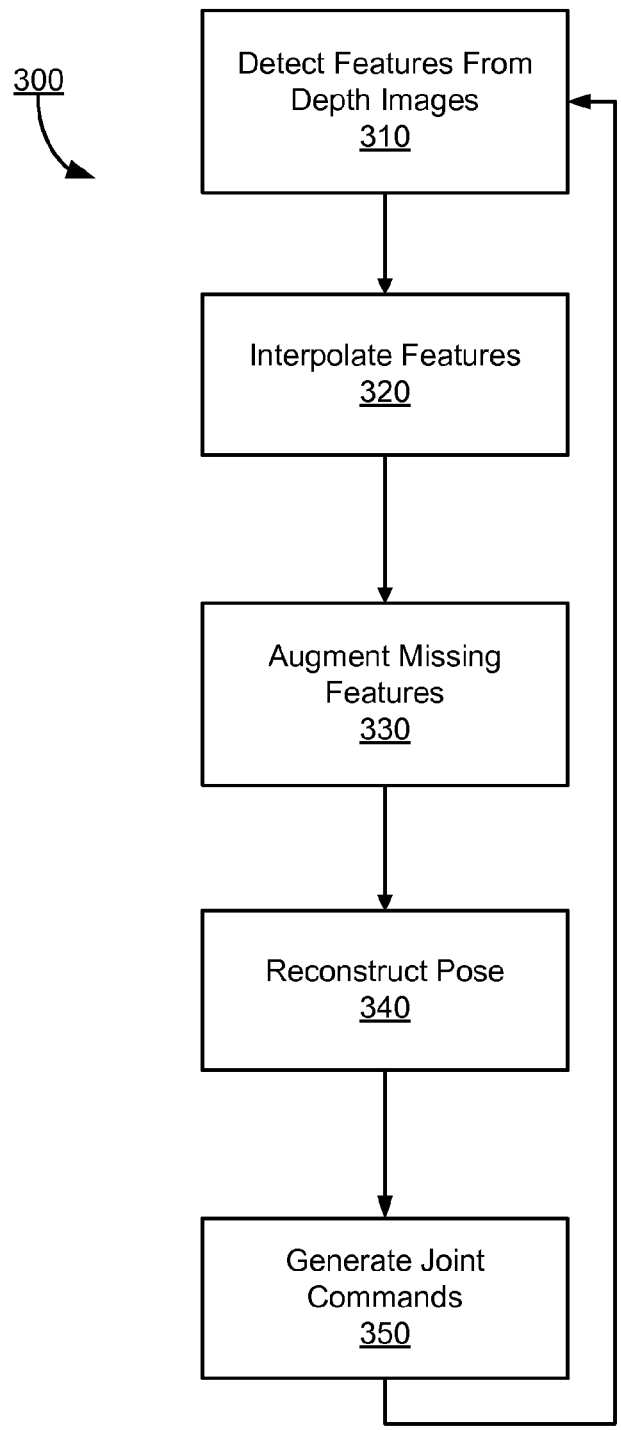
FIG. 3 is a flow diagram illustrating a process of the motion retargeting system shown in FIG. 1 in accordance with one embodiment of the invention.

FIG. 3 is a flowchart illustrating an example process of the motion retargeting system 106 for generating joint commands 108 from observed motion descriptors in accordance with one embodiment of the invention.

The motion retargeting system 106 (or the feature detection module 202) detects 310 body features of the human actor in the depth image stream 108. Additional information about detecting body features in a depth image stream is available in U.S. patent application Ser. No. 12/709,221, filed Feb. 19, 2010, titled "Body Feature Detection and Human Pose Estimation Using Inner Distance Shape Contexts", the disclosure of which is incorporated by reference herein in its entirety.

The motion retargeting system 106 (or the interpolation module 204) interpolates 320 the detected features to re-sample the data to a higher rate (e.g., 100 Hz). In one embodiment, the motion retargeting system 106 interpolates 320 the detected features using a local cubic spline interpolation routine. The interpolation is performed to ensure stability of numerical integrations performed in the pose reconstruction and motion control module 208. In one embodiment, the motion retargeting system 106 low-pass filters the detected features before interpolating the filtered features.

The motion retargeting system 106 (or the missing feature augmentation module 206) augments 330 the interpolated features with positions of undetected features and generates augmented feature vector. As noted above, the motion retargeting system 106 may detect less than fourteen body features at each frame due to occlusions or unreliable observations. The motion retargeting system 106 estimates those undetected features using previously generated predicted features. If m<k, the detected features are augmented with (k−m) predicted features p obtained from forward kinematics computations of the reconstructed pose.

The motion retargeting system 106 (or the pose reconstruction and motion control module 208) reconstructs 340 the observed body pose of the human actor in a human model and predicts subsequent features (or feature point positions). The motion retargeting system 106 predicts subsequent features by enforcing kinematic constraints of the human model, such as joint limitations and self penetration avoidance.

The motion retargeting system 106 (or the pose reconstruction and motion control module 208) generates 350 joint commands 110 based on the reconstructed body pose for controlling the movements of the target system 104. The reconstructed body pose corresponds to a set of task descriptors in the task space. The motion retargeting system 106 converts the task descriptors in the task space to joint commands in the joint space at both the velocity level and the acceleration level using a weighted pseudo-inverse matrix. The process for generating 350 the joint commands 110 is described in further detail in the following sections and with regard to FIG. 4.

One or more portions of the method 300 may be implemented in embodiments of hardware and/or software or combinations thereof. For example, the method 300 may be embodied through instructions for performing the actions described herein and such instrumentations can be stored within a non-transitory computer readable medium (e.g., flash memory, RAM, nonvolatile magnetic storage device) and are executable by a computer processor. Furthermore, those of skill in the art will recognize that other embodiments can perform the steps of the method 300 in a different order. Moreover, other embodiments can include different and/or additional steps than the ones described here. The motion retargeting system 106 can perform multiple instances of the steps of method 300 concurrently and/or perform steps in parallel.

Motion Control of a Robotic Mechanism

The motion of a robotic mechanism such as the target system 104 (also called "the target") in a joint-space can be described using the following equation:

$$\tau = H(q)\ddot{q} + C(q,\dot{q})\dot{q} + \tau_g(q) + J^T f_e, \quad (1)$$

where $q$, $\dot{q}$, $\ddot{q}$, and $\tau$ denote (n×1) generalized vectors of joint position, velocity, acceleration and force variables, respectively, H is an (n×n) joint-space inertia matrix, C is an (n×n) matrix such that $C\dot{q}$ is the (n×1) vector of Coriolis and centrifugal terms, $\tau_g$ is the (n×1) vector of gravity terms, J is a Jacobian matrix, and $f_e$ is the external spatial force acting on the target.

In the absence of an external force acting on the target, controlling the target described by Equation 1 can be handled using a nonlinear model-based compensation with the following structure, $$\tau = \hat{H}(q)\alpha + \hat{C}(q,\dot{q})\dot{q} + \hat{\tau}_g(q), \quad (2)$$

where the vector α represents a resolved acceleration in terms of joint variables, and the notation ˆ denotes estimates of the components of the target. Provided the model parameters in Equation 2 match those of Equation 1, α can be designed as a reference joint acceleration vector $\ddot{q}_r$, which decouples and linearizes the closed loop system, as suggested in the following equation:

$$\alpha = \ddot{q}_r. \quad (3)$$

Additional stabilizing terms may be added in Equation 2 if desired. Described below are techniques for computing α that ensure tracking of a desired position and/or desired orientation of a set of task variables specified in Cartesian-space.

Trajectory Conversion from Task Space to Joint Space

In general, task variables can operate in the full six dimensional task-space, three for position and three for orientation. Suppose there are N task variables, each task variable indexed by k. The spatial velocity vector of the $k_{th}$ task variable is given by the following equation, $$v_k = [\omega_k \dot{p}_k]^T, \quad (4)$$

where $\omega_k$ and $\dot{p}_k$ are vectors corresponding to the angular velocity of the task frame and the linear velocity of the task position, respectively. The mapping between joint variables and task variables is obtained by considering the differential kinematics relating the two spaces, as indicated in the following two equations:

$$v=J\dot{q}, \quad (5)$$

$$a=J\ddot{q}+\dot{J}\dot{q}, \quad (6)$$

where $a=\dot{v}$, and v and J correspond to the augmented spatial velocity vector and the augmented task Jacobian matrix formed by concatenation of the individual tasks, as defined in the following two equations:

$$v=[v_1^T \ldots v_k^T \ldots v_N^T]^T, \quad (7)$$

$$J=[J_1^T \ldots J_k^T \ldots J_N^T]^T. \quad (8)$$

The augmented desired spatial velocity and acceleration vectors, denoted by $(v_d, a_d)$, can be constructed in the same fashion.

Velocity-Based Motion Control

One approach to compute $\alpha$ from the task variables is by a first-order trajectory conversion to obtain $\dot{q}$, followed by numerical differentiation as illustrated in the following equations:

$$\dot{q}_r=J^+(v_d+Ke), \quad (9)$$

$$\alpha = \frac{d}{dt}(\dot{q}_r), \quad (10)$$

where K is a positive definite gain matrix and vector e describes the orientation and position error between the desired and computed task descriptors, as illustrated in the following equation:

$$e = \begin{bmatrix} \frac{1}{2}(n \times n_d + s \times s_d + c \times c_d) \\ p_d - p \end{bmatrix}, \quad (11)$$

where $R_d=[n_d,s_d,c_d]$ and $R=[n\ s\ c]$ correspond to the desired and computed unit vector triple representation of the task frame orientation, respectively.

Equations 9 and 10 may be used in Equation 2. A joint velocity feedback term can be added in the velocity-based control to provide stability, as illustrated in the following equation:

$$\tau=\hat{H}(q)\alpha+\hat{C}(q,\dot{q})\dot{q}+\hat{\tau}_g(q)+K_{q,v}(\dot{q}_r-\dot{q}), \quad (12)$$

where $K_{q,v}$ is a positive definite joint-space gain matrix. The first-order kinematic inversion defined in Equation 9 can be used in enforcing kinematic constraints and, as described in detail below, in constrained movement control at the acceleration level.

Acceleration-Based Motion Control

One approach to decouple and linearize the closed loop system is to form the resolved acceleration control input $\alpha$ in Equation 3 using the following relationship, $$\alpha=J^+(a_r-\dot{J}\dot{q}), \quad (13)$$

where the matrix $J^+$ denotes the pseudo-inverse of J, and $a_r$ is defined in the following equation:

$$a_r=a_d+K_v(v_d-v)+K_pe, \quad (14)$$

where $K_p$ and $K_v$ are positive definite diagonal position and velocity feedback gain matrices, respectively.

The first and second-order closed loop inverse kinematics procedures described by Equation 9 and Equation 13, respectively, are effective methods to perform trajectory conversion from task-space to joint-space. One approach for solving the first-order constrained closed loop inverse kinematics (CC-LIK) problem in order to provide an effective and stable solution for self collision avoidance is described in detail in U.S. patent application Ser. No. 12/258,184, filed Oct. 24, 2008, titled "Real-Time Self Collision And Obstacle Avoidance Using Weighting Matrix", the disclosure of which is incorporated by reference herein in its entirety.

Closed Loop Inverse Kinematics

Closed loop inverse kinematics (CLIK) is an effective method to perform the trajectory conversion from task space to joint space. A singularity robust CLIK formulation which produces constrained joint velocities, $\dot{q}_c$, is given by $$\dot{q}_c=J^+v_r, \quad (15)$$

where $$v_r=v_d+K_pe, \quad (16)$$

and $J^+$ denotes the right pseudo-inverse of J weighted by the positive definite matrix W, as illustrated in the following equation:

$$J^+=W^{-1}J^T(JW^{-1}J^T)^{-1}. \quad (17)$$

Furthermore, if J is a square non-singular matrix, and W is the identity matrix, $J^+$ can be replaced by the standard matrix inverse $J^{-1}$.

The weight matrix W may be appropriately designed to enforce kinematic constraints by penalizing those joints whose motion directs the segments toward constraints. Kinematic constraints include joint limit constraints as well as constraints for self-collision (or self-penetration). The weight matrix can be further conditioned to achieve dynamic consistency such as minimization of kinetic energy and torque. In one embodiment, to achieve both kinematic and dynamic consistency, W is constructed as the superposition of weight matrices, as shown in the following equation $$W=W_K+W_D, \quad (18)$$

where $W_K$ is a weight matrix to enforce kinematic constraints, and $W_D$ is a weight matrix to achieve dynamic consistency. The design of the weight matrices is described in further detail below.

The matrix $W_K$ is constructed as a diagonal matrix whose elements are derived by considering the gradients of the joint limit and collision potential functions, according to one embodiment. The matrix $W_K$ is influenced by the n×n joint limit weight matrix $W_{JL}$ and the n×n collision avoidance weight matrix $W_{COL}$. One example composite of the matrix $W_K$ created based on empirical results is defined in the following equation:

$$W_K=a\ W_{JL}+(1-a)W_{COL}, \quad (19)$$

where a is a scalar index which can be used to modulate the contribution of the joint limit weight matrix and the collision weight matrix. The matrices $W_{JL}$ and $W_{COL}$ are constructed based on candidate joint limit and collision potential functions, denoted by h(q) and f(q), respectively.

Joint Limit Constraints

Joint limit avoidance may be achieved by the proper selection of the diagonal matrix $W_{JL}$. In one embodiment, the matrix $W_{JL}$ is constructed based on a candidate joint limit potential function, denoted by h(q), that has higher values when joints near their limits and tends to infinity at the joint limits. The gradient of h, denoted as $\nabla h$, represents the joint limit gradient function, an n×1 vector whose entries point in the direction of the fastest rate of increase of h. The gradient associated with the $i_{th}$ (i=1 ... n) degree of freedom is denoted by $\nabla h_i$ and defined in the following equation:

$$\nabla h_i = \frac{\partial h(q)}{\partial q_i} = \frac{(q_{i,max} - q_{i,min})^2 (2q_i - q_{i,max} - q_{i,min})}{4(q_{i,max} - q_i)^2 (q_i - q_{i,min})^2}, \quad (20)$$

where $q_i$ represents the generalized coordinates of the $i_{th}$ degree of freedom, and $q_{i,min}$ and $q_{i,max}$ are the lower and upper joint limits, respectively. The gradient $\nabla h_i$ is equal to zero if the joint is at the middle of its range and goes to infinity at either limit. The joint limit weight matrix $W_{JL}$ is constructed as an n×n diagonal matrix with diagonal elements $w_{JL_i}$. The scalars $w_{JL_i}$ are defined by the following equation:

$$w_{JLi} = \begin{cases} 1 + |\nabla h_i| & \text{if } \Delta|\nabla h_i| \geq 0 \\ 1 & \text{if } \Delta|\nabla h_i| < 0. \end{cases} \quad (21)$$

The term $|\nabla h_i|$ represents the change in the magnitude of the joint limit gradient function. A positive value indicates the joint is moving toward its limit while a negative value indicates the joint is moving away from its limit.

Collision Constraints

Collisions between two unconnected segments (or segments which do not share a joint) may be achieved by the proper selection of the collision weight matrix $W_{COL}$. Let d (d≥0) correspond to the minimum distance between two segment pairs. Let $f(q, d)$ represents a candidate collision function that has a maximum value at d=0 and decays exponentially toward zero as d increases.

In one embodiment, the gradient of $f$, denoted as $\nabla f$, is defined as the collision gradient function, an n×1 vector whose entries point in the direction of the fastest rate of increase of $f$. The collision gradient function may be described using the following equation, $$\nabla f = \frac{\partial f}{\partial q} = \frac{\partial f}{\partial d} \frac{\partial d}{\partial q}. \quad (22)$$

In case of self collisions, the second term in Equation 22 may be computed as follows, $$\frac{\partial d}{\partial q} = \frac{1}{d} [J_a^T (p_a - p_b) + J_b^T (p_b - p_a)]^T, \quad (23)$$

where $p_a$ and $p_b$ represent position vectors, referred to the base, of the two collision points, and $J_a$ and $J_b$ are the associated Jacobian matrices. The coordinates $p_a$ and $p_b$ can be obtained using a standard collision detection software package. In case of collision with the environment, the Jacobian associated with the environment collision point is zero. Similar to the joint limit weight function, $W_{COL}$ may be constructed by an n×n diagonal matrix with diagonal elements $w_{COL_i}$ (i=1 ... n) defined by the following equation, $$w_{COL_i} = \begin{cases} 1 + |\nabla f_i| & \text{if } \Delta|\nabla f_i| \geq 0 \\ 1 & \text{if } \Delta|\nabla f_i| < 0. \end{cases} \quad (24)$$

The elements of $\nabla f$ represent the degree to which each degree of freedom influences the distance to collision. It is appropriate to select a function $f$ such that its gradient is zero when d is large and infinity when d approaches zero. One such candidate function is, $$f = \rho e^{-\alpha d} d^{-\beta}, \quad (25)$$

where $\alpha$ and $\beta$ are parameters to control the rate of decay and $\rho$ controls the amplitude. The partial derivative of $f$ with respect to d is $$\frac{\partial f(q)}{\partial d} = -\rho e^{-\alpha d} d^{-\beta} (\beta d^{-1} + \alpha). \quad (26)$$

It follows that $\nabla f$ may be computed from Equations 22, 23, and 26.

The term $\Delta|\nabla f|$ in Equation 24 represents the change in the magnitude of the collision gradient function. A positive value indicates the joint motion is causing the collision point to move toward collision while a negative value indicates the joint motion is causing the collision point to move away from collision. When a collision point is moving toward collision, the associated weight factor, described by the first condition in Equation 24, becomes very large causing the joints affecting the motion of the collision point to slow down. When two segments are about to collide, the weight factor is near infinity and the joints contributing to collision virtually stop. If two segments are moving away from collision, there is no need to restrict or penalize the motions. In this scenario, the second condition in Equation 24 allows the joint to move freely.

Suppose a total of $N_c$ segment pairs are checked for self collision. Let j (j=1 ... $N_c$) be the index of the $j_{th}$ collision pair, and $d_j$ the minimum distance between the two colliding segments. Let $p_{a_j}$ and $p_{b_j}$ represent the coordinates, referred to the base, of the two colliding point pairs for the $j_{th}$ collision pair. The candidate potential function for each collision pair is given by, $$f_j = \rho_j e^{-\alpha_j d_j} d_j^{-\beta_j}. \quad (27)$$

Its gradient can be computed as before, $$\nabla f_j = \frac{\partial f_j}{\partial q} = \frac{\partial f_j}{\partial d_j} \frac{\partial d_j}{\partial q}. \quad (28)$$

It follows that the collision weight matrix for each collision pair, denoted by $W_{COL_j}$ can be computed as outlined above. The collision weight matrix is comprised of the contribution of each collision pair as given by, $$W_{COL} = \frac{1}{N_c} \sum_{j=1}^{N_c} W_{COL_j}. \quad (29)$$

Dynamic Consistency

The weight matrix W can be constructed to realize additional performance objectives. Since the generalized inverse in Equation 17 minimizes the cost $\dot{q}W\dot{q}$, the solution in Equation 15 optimizes approximately the instantaneous weighted kinetic energy, since the sum of squares of joint velocities are minimized. To achieve minimization of the kinetic energy, consider the following definition of kinetic energy, denoted by U:

$$U = 1/2 \dot{q}^T H \dot{q} \qquad (30)$$

It follows that the instantaneous kinetic energy U may be minimized by configuring W=H in Equation 17. The inertia weighted pseudo-inverse is called the dynamically consistent generalized inverse when used in redundancy resolution at the acceleration level.

To achieve both kinematic consistency (satisfying kinematic constraints) and dynamic consistency (minimizing kinetic energy), the two objectives must be combined in the weight matrix of Equation 18. An effective solution is to assign $W_D$ as follows:

$$W_D = H - I. \qquad (31)$$

It should be noted that when the target is away (or moving away) from kinematic constraints, the diagonal matrix $W_K$ is the identity matrix. In this case, the expression in Equation 31 results in minimization of the instantaneous kinetic energy. When the target approaches a kinematic constraint, the diagonal elements of $W_K$ which contribute to motion in the direction of the constraints will become increasingly large and the associated joint velocities will approach zero. In this case, the influence of very large elements in $W_K$ will overshadow the effects of $W_D$, and the higher priority objective to satisfy the kinematic constraints will be executed.

The matrix H can become numerically ill-conditioned and produce instabilities when computing the pseudo-inverse. A regularization term may be added to Equation 31 to avoid numerical issues. Also, when the target does not exhibit redundancy, the notion of an optimum inverse solution does not exist since the target becomes over-constrained. However, dynamic consistency is still beneficial in generating a smooth solution when there are outliers or excessive noise in the detected key-points.

Constrained Resolved Accelerations

Let $\alpha_c$ be a vector corresponding to the constrained resolved accelerations, which may be folded into the dynamic equations of motion as in Equation 2, $$\tau = \hat{H}(q)\alpha_c + \hat{C}(q,\dot{q})\dot{q} + \hat{\tau}_g(q). \qquad (32)$$

The constrained resolved acceleration vector $\alpha_c$ can be constructed as follows:

$$\alpha_c = \alpha + G_v(\dot{q}_c - \dot{q}), \qquad (33)$$

where $\dot{q}_c$ is computed from the first-order constrained kinematics inversion of Equation 15, and $G_v$ is a diagonal positive definite joint velocity gain matrix. For targets which exhibit redundancy, it is advantageous to exploit the redundancy and include a null-space projection term when computing $\alpha$, such that $$\alpha = J^+(a_r - \dot{J}\dot{q}) + N\zeta, \qquad (34)$$

where $\zeta$ is an arbitrary vector, and $N = I - J^+ J$ projecting $\zeta$ into the null space of J. The closed loop task error dynamics of the control law given by Equation 33 is described by the following equation:

$$\ddot{e} + K_v \dot{e} + K_p e = -J G_v (\dot{q}_c - \dot{q}). \qquad (35)$$

The left side of Equation 35 describes the task error dynamics. The right side of Equation 35 characterizes the constraint error dynamics, i.e., the error in tracking the reference constraint velocities $\dot{q}_c$. Equation 35 reveals that as long as $\dot{q}_c - \dot{q}$ is non-zero, the terms on the right side will interfere with the task-space tracking error dynamics. Provided there are sufficient number of degrees of freedom to execute the tasks and satisfy the constraints, the gain $G_v$ can be modulated to force the task-space tracking error to zero. The larger the gain, the faster the convergence. However, an excessively large $G_v$ may introduce instability. The vector $\zeta$ may be keenly designed to further stabilize the self-motion. One example construct of the vector $\zeta$ is given in the following equation:

$$\zeta = G_{v_N}(\dot{q}_c - \dot{q}), \qquad (36)$$

where $G_{v_N}$ is a diagonal positive definite matrix. In one embodiment, $G_{v_N} = G_v$. Compliance and damping characteristics of the self-motion may be further improved by designing an adaptive $G_v$ to have small values when the target is away from the constraints and large values near the constraints.

In one embodiment, taking into account the occurrence of singularities in the matrix J, the pseudo-inverse is replaced with the following:

$$J^* = W^{-1} J^T (J W^{-1} J^T + \lambda^2 I)^{-1}, \qquad (37)$$

where $J^*$ denotes the singularity robust right pseudo-inverse of J regularized by the damping factor $\lambda$, and W represents the constraint weight matrix as given in Equation 19.

The use of the constraint matrix W in Equation 34 forces the acceleration $\alpha$ contributing to violation of a kinematic constraint to zero. Therefore, the use of W in Equation 34 effectively dampens motion as the robot configuration approaches the constraint manifold, providing additional stability and robustness to the controller.

Based on the above discussion, the acceleration a is computed as follows, depending on availability of redundant degrees of freedom to perform the original tasks:

$$\alpha = \begin{cases} J^+(a_r - \dot{J}\dot{q}) + N\zeta & \text{if } m < n \\ J^+(a_r - \dot{J}\dot{q}) & \text{if } m \geq n, \end{cases} \qquad (38)$$

where m is the dimension of the primary (operational) tasks and n is the total number of available degrees of freedom. Equations 33 and 38 constitute the generalized constrained resolved acceleration vectors. The solution is feasible even when there are insufficient degrees of freedom to execute both the constraints and the operational tasks.

Foot Constraints

For whole body motion control of legged humanoid robots, the foot contact constraints must also be enforced. The position of each foot can be treated as a task variable and controlled in a prioritized redundancy resolution scheme with two sub-tasks. The higher priority sub-tasks enforce the foot contact constraints, while the lower priority sub-tasks operate in the null-space of the primary task and handle tracking of upper body operational tasks. The resolved acceleration vector therefore is divided into two prioritized sub-tasks, as illustrated in the following equation:

$$\alpha = \alpha_1 + \alpha_2, \qquad (39)$$

where $\alpha_1$ and $\alpha_2$ are the solutions of the first and second priority sub-tasks, respectively.

Let $a_{r,f}$ (see Equation 14) be the reference spatial acceleration of the foot (right and left) sub-tasks as defined in the following equation, $$a_{r,f} = \begin{bmatrix} a_{r,rf} \\ a_{r,lf} \end{bmatrix}, \qquad (40)$$

where rf and lf denote right and left foot, respectively. Note that when the feet are fixed on the ground, $a_{f,d} = v_{f,d} = 0$. The solution of the first sub-task $\alpha_1$ can be computed from Equation 13 as follows:

$$\alpha_1 = J_f^+(a_{r,f} - \dot{J}_f \dot{q}), \quad (41)$$

where $$J_f = [J_{rf}^T J_{lf}^T]^T, \quad (42)$$

is the augmented Jacobian for both feet, and the generalized inverse, $J_f^+$, is weighted to achieve kinematic and dynamic consistency as described in Equation 18. In one embodiment, the joint limits at the knee are designed to barely avoid the singular configuration. In this embodiment, the robot can achieve nearly upright stance and produce more natural and energy efficient motions.

Let $a_{r,u}$ be the reference spatial acceleration of the upper-body sub-tasks including the head, arms, and torso. The solution to the second priority sub-task, corresponding to the upper body degrees of freedom, lies on the null space of the first sub-task solution:

$$\alpha_2 = \hat{J}_u^+(a_{r,u} - \dot{J}_u \dot{q} - J_u \alpha_1), \quad (43)$$

$$\hat{J}_u = J_u(I - J_f^+ J_f), \quad (44)$$

where $$J_u = [J_1^T \ldots J_k^T \ldots J_{N_u}^T]^T \quad (45)$$

is the augmented Jacobian for upper-body and torso tasks. The parameter $N_u$ denotes the number of upper-body tasks.

It follows that the whole-body constrained resolved acceleration vector with foot contact constraints can be obtained from Equation 33, where $\alpha$ is determined from Equations 39, 41, and 43, and the solution for $\dot{q}_c$ must take into account the foot constraints in a two priority sub-task solution:

$$\dot{q}_c = J_f^+ v_{r,f} + \hat{J}_u^+(v_{r,u} - J_u J_f^+ v_{r,f}), \quad (46)$$

where the reference spatial velocity vectors $v_{r,f}$ and $v_{r,u}$ are determined from Equation 16. The generalized inverses $J_f^+$ and $\hat{J}_u^+$, described above are weighted by W to satisfy the kinematic constraints and achieve dynamic consistency.

Constrained Resolved Accelerations Control Process

Figure 4:
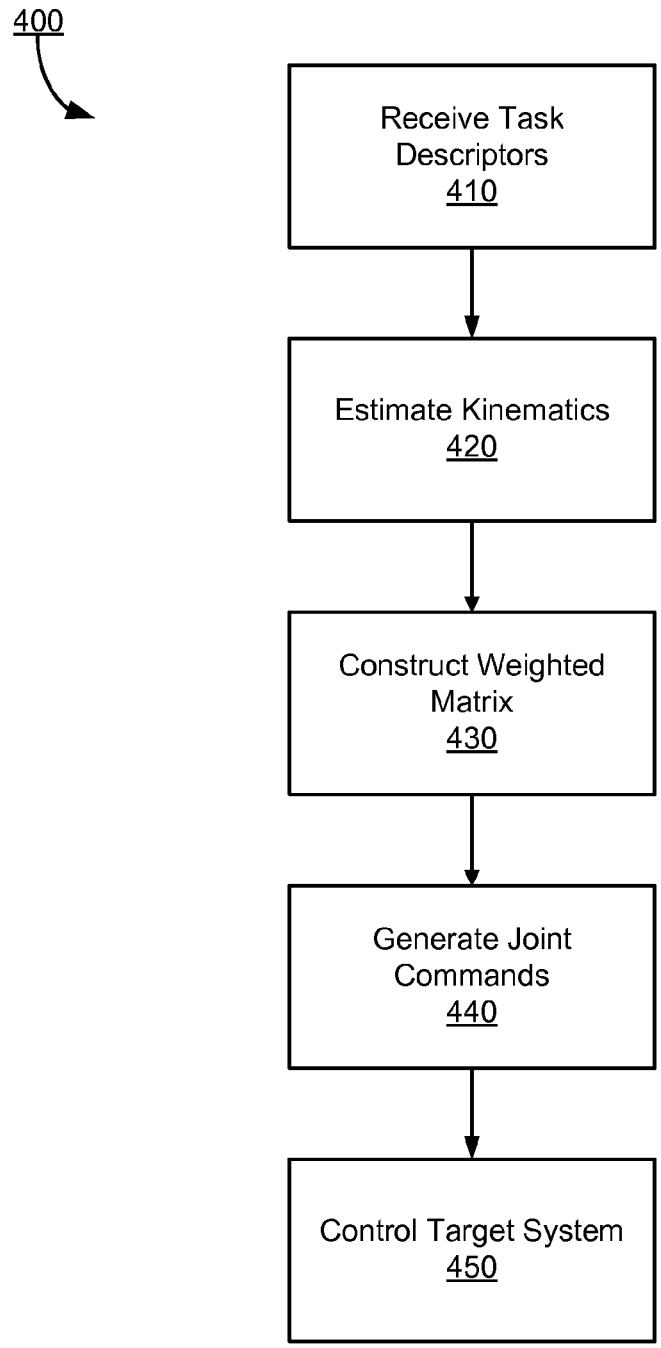
FIG. 4 is a flow diagram illustrating a process of the pose reconstruction and motion control module shown in FIG. 2 in accordance with one embodiment of the invention.

Referring to FIG. 4, a flow diagram describing a process 400 of the pose reconstruction and motion control module 208 for generating joint commands 110 that control the target system 104 in accordance with one embodiment of the invention.

As shown, the pose reconstruction and motion control module 208 receives 410 task descriptors describing movements of the source system 102 (e.g., from the missing feature augmentation module 206), and estimates 420 kinematics of body segments of the target system 104 (e.g., based on previously generated joint commands and/or sensors). The pose reconstruction and motion control module 208 constructs 430 a weighted pseudo-inverse matrix to enforce kinematic constraints as well as achieve dynamic consistency based on the estimated kinematics, and generates 440 joint commands by converting the task descriptors to the joint commands using the weighted pseudo-inverse matrix. The pose reconstruction and motion control module 208 controls 450 the body segments in the target system 104 at both the velocity level and the acceleration level and enforces kinematic constraints using the generated joint commands.

One or more portions of the process 400 may be implemented in embodiments of hardware and/or software or combinations thereof.

By controlling the movement of a target system at the acceleration level, embodiments of the disclosed invention provides an effective solution to dampen motion as the target system approaches kinematic constraints, thereby providing additional stability and robustness to the controller. In addition, unlike the existing approaches, this solution is feasible even when there are insufficient degrees of freedom to execute both the constraints and the operational tasks.

Some portions of above description describe the embodiments in terms of algorithmic processes or operations, for example, the processes and operations as described with FIGS. 3 and 4.

One embodiment of the present invention is described above with reference to the figures where like reference numbers indicate identical or functionally similar elements. Also in the figures, the left most digits of each reference number corresponds to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" or "an embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems. The invention can also be in a computer program product which can be executed on a computing system.

The present invention also relates to an apparatus for performing the operations herein. This apparatus may be specially constructed for the purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A computer-implemented method for controlling an articulated system, the method comprising:
   receiving a task descriptor specifying a movement of a body segment of the articulated system;
   estimating kinematics of the body segment of the articulated system;
   constructing a weighted matrix based on the estimated kinematics of the body segment;
   generating a joint command for a joint associated with the body segment, wherein the joint command controls an acceleration of the body segment based on the weighted matrix and a constrained resolved acceleration that is based on a joint acceleration vector, a diagonal positive definite joint velocity gain matrix, and a difference between a constrained joint velocity vector and a joint velocity vector; and
   controlling the joint associated with the body segment using the joint command.

2. The method of claim 1, wherein the weighted matrix comprises a weighted pseudo-inverse matrix constructed as a superposition of a plurality of weighted matrices, one of the plurality of weighted matrices is constructed to control a velocity of the body segment.

3. The method of claim 2, wherein one of the plurality of weighted matrices is constructed to penalize a joint in the articulated system with a movement directing a body segment of the articulated system towards a kinematic constraint, the kinematic constraint comprising at least one from the group consisting of a joint limit constraint and a self-collision constraint.

4. The method of claim 2, wherein one of the plurality of weighted matrices is constructed to minimize the instantaneous kinetic energy of the articulated system.

5. The method of claim 1, wherein one of the plurality of weighted matrices sets the constrained resolved acceleration of the joint associated with the body segment to zero responsive to the acceleration or velocity of the joint contributing to a violation of a kinematic constraint, the kinematic constraint comprising at least one from the group consisting of a joint limit constraint and a self-collision constraint.

6. The method of claim 1, wherein the articulated system comprises a legged humanoid robot, the method further comprising:
   generating a high-priority task for enforcing foot contact constraints for feet of the legged humanoid robot.

7. The method of claim 1, wherein generating the joint command further comprises:
   generating the joint command for the joint associated with the body segment based on the weighted matrix and a joint velocity feedback term designed to provide stability for a resulting movement of the articulated system.

8. The method of claim 1, further comprising:
   receiving an image stream comprising movements of a source system;
   detecting body features of the source system in the image stream; and
   generating the task descriptor based on the detected body features.

9. The method of claim 8, wherein the source system comprises a captured image of a human subject, the articulated system comprises a humanoid robot, and the joint command controls the humanoid robot to simulate the human motion.

10. The method of claim 1, wherein the constrained joint velocity vector is generated using a closed loop inverse kinematics (CLIK) algorithm.

11. A non-transitory computer-readable storage medium containing executable computer program code for performing a method for controlling an articulated system, the method comprising:
   receiving a task descriptor specifying a movement of a body segment of the articulated system;
   estimating kinematics of the body segment of the articulated system;
   constructing a weighted matrix based on the estimated kinematics of the body segment;
   generating a joint command for a joint associated with the body segment, wherein the joint command controls an acceleration of the body segment based on the weighted matrix and a constrained resolved acceleration that is based on a joint acceleration vector [alpha], a diagonal positive definite joint velocity gain matrix, and a difference between a constrained joint velocity vector and a joint velocity vector; and
   controlling the joint associated with the body segment using the joint command.

12. The storage medium of claim 11, wherein the weighted matrix comprises a weighted pseudo-inverse matrix constructed as a superposition of a plurality of weighted matrices, one of the plurality of weighted matrices is constructed to control a velocity of the body segment.

13. The storage medium of claim 12, wherein one of the plurality of weighted matrices is constructed to penalize a joint in the articulated system with a movement directing a body segment of the articulated system towards a kinematic constraint, the kinematic constraint comprising at least one from the group consisting of a joint limit constraint and a self-collision constraint.

14. The storage medium of claim 12, wherein one of the plurality of weighted matrices is constructed to minimize the instantaneous kinetic energy of the articulated system.

15. The storage medium of claim 11, wherein one of the plurality of weighted matrices sets the constrained resolved acceleration of the joint associated with the body segment to zero responsive to the acceleration or velocity of the joint contributing to a violation of a kinematic constraint, the kinematic constraint comprising at least one from the group consisting of a joint limit constraint and a self-collision constraint.

16. A system for controlling an articulated system, the system comprising:
a computer processor for executing executable computer program code;
a computer-readable storage medium containing the executable computer program code for performing a method comprising:
receiving a task descriptor specifying a movement of a body segment of the articulated system;
estimating kinematics of the body segment of the articulated system;
constructing a weighted matrix based on the estimated kinematics of the body segment;
generating a joint command for a joint associated with the body segment, wherein the joint command controls an acceleration of the body segment based on the weighted matrix and a constrained resolved acceleration that is based on a joint acceleration vector [alpha], a diagonal positive definite joint velocity gain matrix, and a difference between a constrained joint velocity vector and a joint velocity vector; and
controlling the joint associated with the body segment using the joint command.

17. The system of claim 16, wherein the weighted matrix comprises a weighted pseudo-inverse matrix constructed as a superposition of a plurality of weighted matrices, one of the plurality of weighted matrices is constructed to control a velocity of the body segment.

18. The system of claim 17, wherein one of the plurality of weighted matrices is constructed to penalize a joint in the articulated system with a movement directing a body segment of the articulated system towards a kinematic constraint, the kinematic constraint comprising at least one from the group consisting of a joint limit constraint and a self-collision constraint.

19. The system of claim 17, wherein one of the plurality of weighted matrices is constructed to minimize the instantaneous kinetic energy of the articulated system.

20. The system of claim 16, wherein one of the plurality of weighted matrices sets the constrained resolved acceleration of the joint associated with the body segment to zero responsive to the acceleration or velocity of the joint contributing to a violation of a kinematic constraint, the kinematic constraint comprising at least one from the group consisting of a joint limit constraint and a self-collision constraint.

* * * * *